United States Patent
Sava

[11] Patent Number: 6,016,891
[45] Date of Patent: Jan. 25, 2000

[54] TREE STAND HARNESS SYSTEM

[76] Inventor: John G. Sava, 2522 Ben Franklin Hwy, Edensburg, Va. 15931

[21] Appl. No.: 09/131,867

[22] Filed: Aug. 10, 1998

[51] Int. Cl.[7] .................................................. A01M 31/02
[52] U.S. Cl. ................................ 182/187; 182/136; 182/6
[58] Field of Search ................................... 182/3, 6, 187, 182/135, 136; 248/74.2

[56] References Cited

U.S. PATENT DOCUMENTS

| | | |
|---|---|---|
| 572,751 | 12/1896 | Hanna . |
| 2,333,646 | 11/1943 | Frankel . |
| 4,244,445 | 1/1981 | Strode ..................................... 182/187 |
| 4,407,391 | 10/1983 | Greenway et al. . |
| 4,446,943 | 5/1984 | Murray ........................................ 182/3 |
| 4,579,196 | 4/1986 | Allen et al. . |
| 4,588,153 | 5/1986 | Boston .................................. 248/74.2 |
| 4,658,533 | 4/1987 | Mendoza ............................... 248/74.2 |
| 4,667,773 | 5/1987 | Davis ..................................... 182/187 |
| 4,687,074 | 8/1987 | Green .......................................... 182/3 |
| 4,712,646 | 12/1987 | Page . |
| 4,921,069 | 5/1990 | Boyles .................................... 182/135 |
| 4,991,689 | 2/1991 | Cole ........................................... 182/3 |
| 5,137,113 | 8/1992 | Lortie . |
| 5,492,198 | 2/1996 | Williams ................................ 182/187 |

Primary Examiner—Alvin Chin-Shue
Attorney, Agent, or Firm—John F. Carroll, IV

[57] ABSTRACT

The present invention relates to a harness system for "climbing" tree stands to assist users in climbing, sitting in and descending trees. The invention has a standoff integrated with or attachable to the climbing tree stand for: (a) receiving a tree strap, (b) retaining a tree strap from inadvertent contact with the tree while the user climbs, sits in, and descends the tree, and (c) quickly releasing a tree strap from the climbing tree stand part.

The system also has a harness part. The harness part has (a) a thigh strap for bearing a user's weight about the user's thigh; (b) a waist strap for bearing a user's weight about the user's waist (the waist strap is attachable to the thigh strap); and (c) a tree strap for bearing a user's weight. The tree strap has a first end, a middle and a second end. The first end is attachable to the waist strap; the second end is passable around the trunk of the tree and slideably attachable to the middle of the tree strap; the middle is releasably attachable to the standoff.

If a user of the invention were to fall and exert adequate force on the tree strap, the standoff would release the middle of the tree strap, allowing the tree strap to become cinched around the tree. The user's weight could then be borne about the user's waist and thigh and supported by the tree.

5 Claims, 3 Drawing Sheets

TREE STAND HARNESS SYSTEM

BACKGROUND

The present invention relates to a harness system that can be used in conjunction with so-called "climbing" tree stands. Many people hunt from temporary perches in trees commonly known as tree stands. Tree stands are made in a variety of ways. For example, they can be made by an individual hunter in his home workshop to suit his own purposes or needs, or they may be commercially manufactured. "Climbing" tree stands, which are described in detail below, are a popular style of commercially manufactured tree stand presently available on the market. The invention described in this document is a harness system that maximizes the utility of climbing tree stands in a number of ways.

It is important to understand climbing tree stands in order to fully appreciate the need for the invention. Climbing tree stands are easily portable tree stands that typically have two main parts: an upper part and a lower part. In use, the upper part of a climbing tree stand is attached around the trunk of a tree. The lower part of the climbing tree stand is attached around the trunk of the same tree at a point on the trunk that is lower than the upper part. The hunter can then stand on the lower part of the tree stand, attach his feet to the lower part, and then grasp the upper part with his hands. By use of his hands and upper body strength, the hunter can place his body weight on the upper part of the stand and, at the same time, use his feet to draw the lower part of the stand up the trunk of the tree. After the lower part of the stand has been drawn several inches (or even feet) up the trunk of the tree, the hunter can then transfer his body weight to his feet (which are then resting on the lower part of the tree stand). The hunter can then slide the upper part of the tree stand farther up the trunk of the tree with his hands. The hunter can repeat the process over and over, first drawing the lower part of the stand up with his feet and then inching the upper part of the stand higher on the trunk of the tree with his hands. In this way a hunter can quickly climb a tree. When the hunter reaches an appropriate height, he can sit in the upper part of the stand and hunt. To descend the tree trunk, the hunter reverses the procedure that was used to climb the tree.

Traditionally, a user of a tree stand who desires to attach himself to a tree he is climbing uses a strap. These straps have a loop at either end. The loop at one end is large and the loop at the other end is small. The user of such a traditionally-styled strap first wraps the strap around the tree. The end of the strap having the large loop is then passed through the small loop and the strap is then cinched against the tree. The hunter then places the large loop over his head and around his chest, with the large loop both encircling his chest and being placed under his armpits. Should the hunter fall from the tree stand, the strap is tightened against both the tree and around the chest of the hunter, thereby preventing and/or lessening the severity of a fall.

Such straps, however, have significant shortcomings. Traditionally-styled straps must be attached to a user and to a tree in a cumbersome process of slipping and sliding loops over each other, around the tree and around the hunter. Such can only be done in the field, at the site of the tree that the hunter desires to climb. As a result, the hunter must detach and re-attach a traditionally-styled strap to himself and to each tree he desires to climb. Since traditionally-styled straps cannot be left attached to a hunter's clothing, the hunter must also pay particular attention to the transportation and storage of these straps so that they do not pick up any unwanted (i.e., human) scents. Also, when used as described herein, these traditionally-styled straps can seriously compress a hunter's chest and/or abdomen during a fall. Additionally, these straps can place the back of a user against a tree after a fall, potentially trapping the user and thereby preventing the user from re-climbing the tree and re-mounting the tree stand and/or preventing the hunter from disengaging himself from the strap.

Additionally, and most importantly, when cinched against a tree, these straps are designed to exert a significant amount of frictional resistance against the tree trunk. Frictional resistance of the strap against the tree trunk is critical in preventing a user from sliding down the trunk of a tree following a fall. However, a significant drawback of these devices is that their design requires that they must exert friction against the tree trunk while the user is climbing the tree. As a result, a user that desires to employ a traditionally-styled strap when climbing a tree must loosen the strap from around the tree, slide the strap up the tree trunk several inches, and then tighten the strap. The user then climbs the tree up to the point at which the strap is attached to the tree trunk. The user then loosens the strap and slides the strap up the tree trunk several inches. The user then tightens the strap. The user can then climb the tree trunk up to the point at which the strap is attached to the tree trunk, repeating the process until the tree is climbed. This is a very arduous. Furthermore, traditionally-styled straps often inconveniently slide down the trunks of trees before the hunter has climbed to the next adjusting position. As a result, many hunters do not use traditionally-styled straps when climbing trees. If hunters do not use traditionally-styled straps when climbing trees, they are also less likely to use the straps when seated on a tree stand.

As a result, there is a need for a harness system that enables a person to wear a harness while climbing, sitting in, and descending a tree. Additionally, there is a need for a harness that is easily wearable by a user while walking to and from a tree stand site, as well as a need for a harness system that can be left attached to the specially scented hunting clothes hunters normally use. Furthermore, there is the need for a harness that is less likely to compress the abdomen and/or chest of a user than is otherwise common with traditionally-styled harnesses. Also, there is a need for a harness that reduces the likelihood of positioning a user with his or her back against a tree.

SUMMARY

The invention is a harness system for facilitating a user climbing a tree with a climbing tree stand. The system has a climbing tree stand part. The climbing tree stand part is for assisting a user in climbing, sitting in and descending a tree. The climbing tree stand part has a standoff integrated with or attached to the climbing tree stand. The standoff is for: (a) receiving a tree strap; (b) retaining a tree strap from inadvertent contact with the tree while the user climbs, sits in, and descends the tree; and (c) quickly releasing a tree strap from the climbing tree stand part. The system also has a harness part. The harness part has a thigh strap for bearing a user's weight about the user's thigh. The harness part also has a waist strap for bearing a user's weight about the user's waist. The waist strap is capable of being attached to the thigh strap. The harness part also has a tree strap for bearing a user's weight. The tree strap has a first end, a middle and a second end. The first end of the tree strap is capable of being attached to the waist strap. The second end of the tree strap is capable of being passed around the trunk of the tree, and the second end of the tree strap is also capable of being slideably attached to the middle of the tree strap. The middle of the tree strap is capable of being releasably attached to the standoff of the climbing tree stand part.

The standoff of the harness system as described herein can also have one or more pieces of flexible tubing attached to the climbing tree stand. These pieces of flexible tubing can have two ends: a distal end and a near end. The near end of each piece of flexible tubing can be attached to the climbing tree stand part, or, alternatively, the near end can be attached to a clamp which is, in turn, attached to the climbing tree stand. The distal end of each piece of flexible tubing can have a slit for receiving a middle portion of a tree strap. As an alternative, the tree strap of the harness system can have a releasable, slideable, mechanical fastener attached to the second end of the tree strap. This mechanical fastener of the invention can be a carabiner.

The invention can also be a kit for releasably harnessing a user to a standoff of a climbing tree stand. The kit can have a thigh strap for bearing a user's weight about the user's thigh. The kit can also have a waist strap for bearing a user's weight about the user's waist. The waist strap can be capable of being attached to the thigh strap. The kit can have a tree strap for bearing a user's weight. The tree strap can have a first end, a middle and a second end. The first end of the tree strap can be capable of being attached to the waist strap. The second end of the tree strap can be capable of being passed around the trunk of the tree, and the second end of the tree strap can also be capable of being slideably attached to the middle of the tree strap. The middle of the tree strap can be capable of being releasably attached to the standoff of the climbing tree stand. The kit can also have a releasable, slideable, mechanical fastener attached to the second end of the tree strap for attachment to the middle of the tree strap. The mechanical fastener of the kit can be a carabiner. The kit can also include one or more standoffs. Each standoff can have a piece of flexible tubing having a near end and a distal end. The near end of each piece of flexible tubing can be attachable to a tree stand. For example, the near end can be attachable to a clamp which is, in turn, attachable to the tree stand. The distal end can have a slit for receiving a middle portion of a tree strap.

DRAWINGS

A preferred embodiment of the present invention will be described in greater detail with reference to the accompanying drawings, wherein like elements bear like reference numerals and where:

DESCRIPTION

The invention is a harness system that can be worn comfortably by a hunter while traveling through the woods to a site where the hunter desires to use a climbing tree stand. Upon reaching the tree stand site, the invention quickly and easily allows the hunter to attach the harness to both a tree that the hunter desires to climb, and to the tree stand that the hunter desires to use to climb the tree. The hunter can then climb the tree, sit in the stand and descend the tree, while at all times being attached to: (a) the harness; (b) the stand; and (c) the tree. The invention is not required to be significantly adjusted by the hunter during use. However, should the hunter fall while climbing the tree, while sitting in the tree stand, or while descending the tree, the invention automatically deploys into position and assists the hunter in lessening the severity of his fall in a manner that is likely to reduce the severity of compression of the hunter's abdomen and/or impingement of the hunter's back against the tree.

Figure 1:
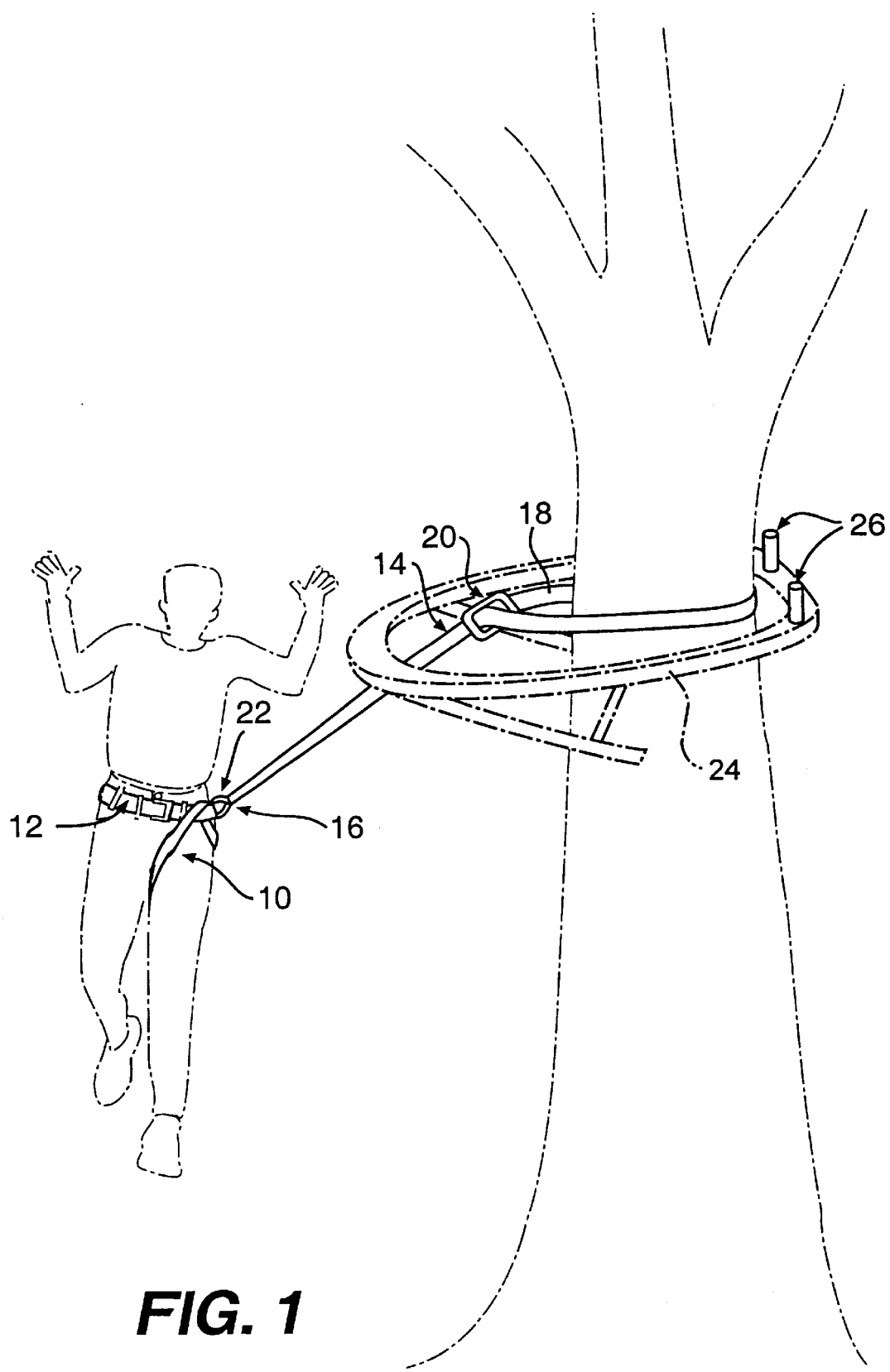
FIG. 1 shows a view of a tree stand harness system.
Figure 2:
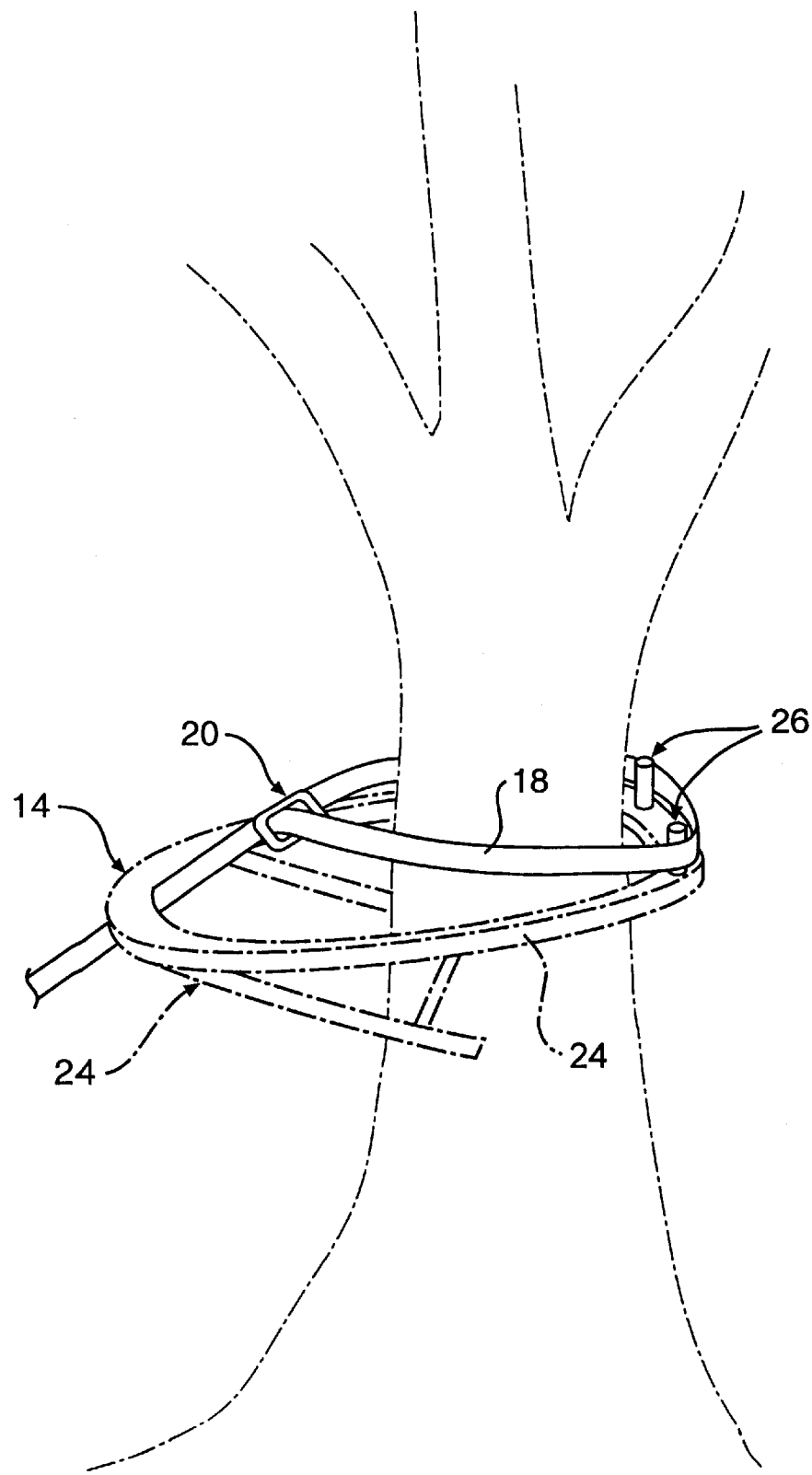
FIG. 2 shows a detail of a portion of a tree stand harness system.

With reference next to the drawings, FIGS. 1 and 2 show a tree stand harness system in a mode of use with the user of the system shown considerably farther from the tree than may naturally occur, but positioned there for the purpose of showing certain detail as described herein. The harness can have several components, including the following. A restraint fabricated of resilient material can be formed into a thigh strap (10) that can be drawn up about a user's thigh. Alternatively, a second thigh strap may be drawn up about a user's other thigh to provide additional support when attached to the waist strap (12) in conjunction with the thigh strap (10), thereby allowing two thigh straps to be used. The thigh strap (10) (as with the other straps described herein) can be a length of nylon webbing or other rope. The thigh strap (10) can have two ends which are each sewn together. A waist strap (12) can then be threaded through belt loops of a user's pants as well as through the thigh strap (10). The waist strap (12) can then be attached around the waist of the user by a conventional, heavy-duty buckle, snap or other mechanical attachment capable of supporting the user's weight in the event of a fall from a tree. The invention can also have a tree strap (14). The tree strap (14) has a first end (16) and a second end (18). A small loop (22) can be formed at the first end (16) of the tree strap (14). Prior to buckling the waist strap (12), the user can slip the small loop (22) of the first end (16) of the tree strap (14) through the waist strap (12) and then buckle the waist strap (12). The tree strap (14) can then be coiled, rolled and/or folded by the user and carried with him or her.

Worn in this way, a hunter can quickly climb one or several trees in a single hunting session without having to repeatedly remove and reassemble the harness from his person. Additionally, the invention is convenient for hunters because the harness remains assembled and attached to the hunter's clothing after the hunter has finished hunting for the day. This is beneficial because hunters typically hunt in specially scented clothing that they remove after hunting and store separately from their regular clothing. Allowing the harness to remain with the special hunting clothing reduces likelihood that the harness might acquire undesirable scents. Because the invention can remain attached to the hunter's clothing, the hunter merely has to put on his clothing, and in so doing, he automatically, then, is wearing the harness. This can be beneficial to hunters who typically dress themselves in their hunting clothes and hunting gear early in the morning, in the dark before dawn.

After the user has placed his leg in the thigh strap (10) and threaded the waist strap (12) through both the thigh strap (10) and the small loop (22) of the first end (16) of the tree strap (14), as described herein, and after the user has arrived at the location of the tree he desires to climb, the user can then complete the assembly of the device. The second end

(18) of the tree strap (14) is distal from the first end (16) of the tree strap (14). The second end (18) of the tree strap (14) can have an attached mechanical fastener (20). This mechanical fastener (20) can be in the form of a releasable, mechanical fastener capable of supporting a user's weight during a fall, such as a carabiner. A carabiner works particularly well with this application because it is small, strong, lightweight and slides readily along the tree strap (14). Additionally, a carabiner is a releasable mechanical fastener. A carabiner-type releasable fastener (20) allows a user of the harness to wear the thigh strap (10), the waist strap (12) and the tree strap (14) while traveling to and from a tree stand in such a manner that, upon his or her arrival to or departure from the tree, the user can quickly and easily complete the assembly or disassembly of the harness as described herein, even in the dark and even if the user is wearing gloves.

Alternatively, however, a carabiner is not required. Any manner of slideably attaching the second end (18) of the tree strap (14), such as that described herein, is appropriate, so long as the manner of attachment can bear the weight of a falling user. For example, even a small loop sewn into the second end (18) of the tree strap (14) may be adequate. In such a case, the tree strap (14) can be drawn about the trunk of a tree. For example, the small loop (22) of the first end (16) of the tree strap (14) can be drawn through the small loop formed in the second end (18) of the tree strap (14), drawing the tree strap (14) snugly about the trunk of the tree. The small loop (22) of the first end (16) of the tree strap (14) can then be attached to the waist strap (12) as described herein.

To complete the assembly of the harness, the user places the lower part of a climbing tree stand around the trunk of the tree he desires to climb. The user then places the upper part (24) of a climbing tree stand around the trunk of the tree he desires to climb. The user then passes the second end (18) of the tree strap (14) about the trunk of the tree and attaches the mechanical fastener (20) to the tree strap (14) at some point between its first end (16) and its second end (18), at the middle of the tree strap (14), as described above (or the user attaches the second end (18) of the tree strap (14) in an alternative, loop-sliding manner as described herein). The user then places the tree strap (14) on the upper part (24) of the climbing tree stand. This upper part (24) of the climbing tree stand has a standoff (26) that is adapted to specially receive the tree strap (14).

Mounted on the circumference of the upper part (24) of the climbing tree stand, the standoff (26) temporarily holds the tree strap (14) away from the tree. In normal use, the standoff (26) prevents the tree strap (14) from engaging the trunk of the tree as the user is climbing the tree, sitting in the tree stand, or descending the tree. However, should the user abruptly place adequate tension on the tree strap (14), such as in a fall, the standoff (26) releases the tree strap (14) from the upper part (24) of the tree stand and allows the tree strap (14) to become engaged with the trunk of the tree. The falling weight of the user on the tree strap (14) then causes the mechanical fastener (20) to slide along the tree strap (14), thereby causing the tree strap (14) to become cinched around the trunk of the tree. The first end (16) of the tree strap (14) then restrains the forward progress of the waist strap (12) and the attached thigh strap (10), which, acting together, are likely to lessen the forward progress of the user.

The standoff (26) could be as simple as a groove or clips on (or around) the perimeter of the upper part (24) of the climbing tree stand. Such a groove or clips could receive the tree strap (14) and prevent the tree strap (14) from engaging the trunk of the tree while the climber is ascending, sitting in or descending the tree. However, in the event of a fall, such a groove or clips could readily release the tree strap (14) from the upper part (24) of the climbing tree stand. As described herein, in such a case, the second end (18) of the tree strap (14) would slide along the tree strap (14), causing the tree strap (14) to tighten against the tree and prevent, lessen and/or slow the farther falling of the user. Any readily releasable standoff (26) could be used on the upper part (24) of the climbing tree stand. Shown in FIG. 1 (in the middle of a fall) and in detail in FIG. 2 (before a fall) are three pieces of flexible rubber tubing (26) attached to the upper part (24) of the climbing tree stand. In use, the tree strap (14) can be drawn around the rubber tubing (26). The rubber tubing (26) will then keep the tree strap (14) from engaging the trunk of the tree while the user is climbing, sitting in or descending the tree; however, should the user fall, the tree strap (14) will be pulled over the flexible rubber tubing (26) and drawn tightly about the trunk of the tree as the mechanical fastener (20), such as a carabiner, of the second end (18) of the tree strap (14) slides along the length of the tree strap (14) and cinches the tree strap (14) around the tree. As described herein, this is likely to stop, lessen and/or slow the fall of a user.

In using the invention, a user can place his leg through the thigh strap (10) and draw the thigh strap (10) up toward his waist. The user can then pass the waist strap (12) through the belt loops of his pants and through the thigh strap (10). The user can place the small loop (22) of the first end (16) of the tree strap (14) through the waist strap (12) and then coil, fold and/or roll the remainder of the tree strap (14), carrying it with him or her. The user can then comfortably walk to and from the location of the tree stand. Also, after hunting, the user can undress and leave the harness attached to his specially scented hunting clothing.

Upon arriving at the tree stand, the user can place the upper and lower parts of the tree stand about the tree trunk; the user can quickly and easily pass the second end (18) of the tree strap (14) about the trunk of the tree and attach the mechanical fastener (20) of the second end (18) of the tree strap (14) to the tree strap (14), thereby encircling the tree with the tree strap (14). The user can then place the tree strap (14) on the upper part (24) of the climbing tree stand. The user can draw the mechanical fastener (20) of the tree strap (14) along the length of the tree strap (14) and place the tree strap (14) on the standoff (26). The user can then climb the tree using the climbing tree stand.

The standoff (26) prevents and/or lessens the likelihood of the tree strap (14) becoming engaged with the trunk of the tree as the user is climbing, sitting in and/or descending the tree; yet, the standoff (26) readily releases the tree strap (14) in the event of a fall. As described herein, in the event of a fall, if the tree strap (14) becomes abruptly disengaged from the standoff (26), the mechanical fastener (20) will slide along the tree strap (14), until the tree strap (14) becomes engaged with the tree. Friction between the tree strap (14) and the tree would be likely to prevent, lessen and/or slow the fall of a user. If the user of the invention were to fall and exert adequate force on the tree strap (14) while climbing, sitting in or descending the tree, the user's weight will be borne about the user's waist and thigh as described herein. This will lessen the likelihood of the user bearing his weight on his chest and/or abdomen. Furthermore, placement of the small loop (22) at the hip of the user along the waist strap (12) will lessen the likelihood of the user's back being drawn against the tree in the event of a fall. Because the harness system can be worn and stored with a hunter's clothing, and because the harness system can be easily attached to a tree in the dark and by a user wearing gloves, and because the system has a reduced likelihood of become accidentally cinched about a tree that a user is climbing except in the case of a fall, and because users who fall while using the device are less likely to have their backs impinged on a tree trunk and less likely to have their abdomens and/or chest cavities compressed, more users are likely to wear such a harness system than wear a traditionally-styled harness.

Figure 3:
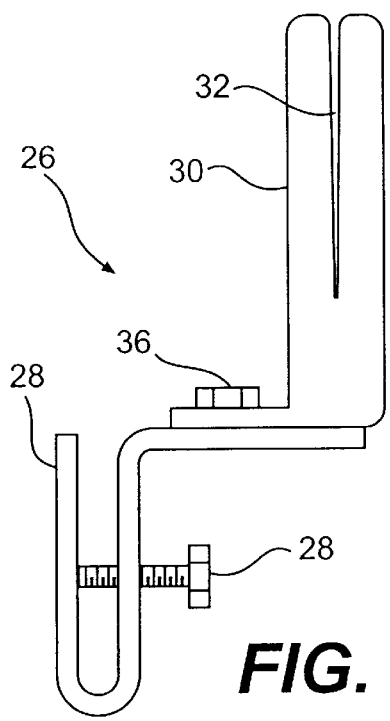
FIG. 3 shows a detail of a mechanical clamp assembly with an attached piece of rubber tubing having a slit, the clamp assembly for forming a standoff releasably attachable to horizontal surfaces of a tree stand.
Figure 4:
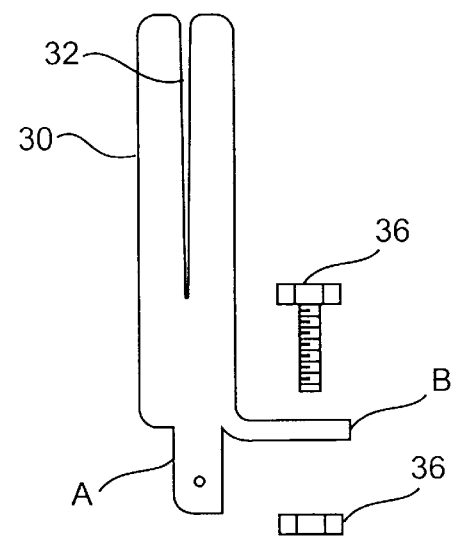
FIG. 4 shows a detail of the rubber tubing of the clamp assembly of FIG. 3 in a first mode ("A") and a second mode ("B") of assembled positions.
Figure 5:
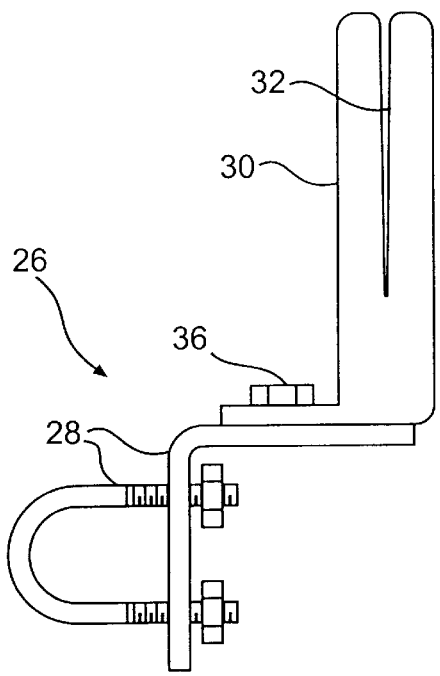
FIG. 5 shows another alternative embodiment of the clamp assembly of FIG. 3, the clamp assembly for forming a standoff that is releasably attachable around a tree stand.
Figure 6:
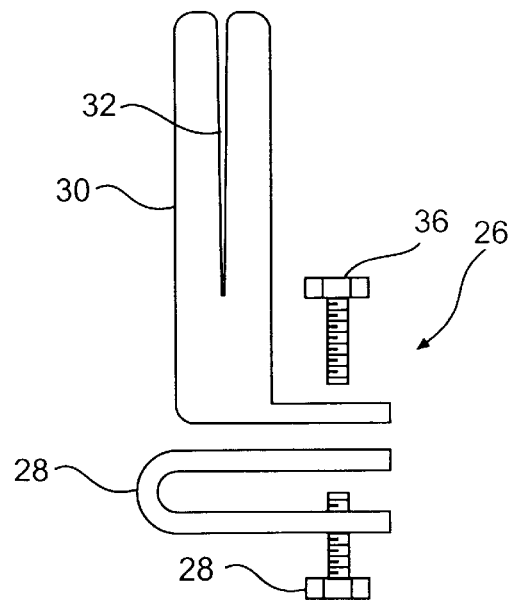
FIG. 6 shows an alternative embodiment of the clamp assembly of FIG. 3, the clamp assembly for forming a standoff that is releasably attachable to vertical surfaces of a tree stand.

It should be understood that the described embodiments merely illustrate principles of the invention. Many modifications, additions and deletions may be made without departure from the description provided. For example, although the harness is shown to have particular utility for hunters, it may also be used by hunters in stationary tree stands, utility workers in conjunction with their work on utility poles, as well as lumberjacks and tree surgeons. As an alternative, the flexible rubber pegs and/or rubber tubing used in fabricating the standoff (26) could have longitudinal slits (32) disposed in their ends, distal from the ends attached to the tree stand. These slits could releasably retain the tree strap (14) and allow the strap (14) to perform as described herein. Alternatively, mechanical clips could be used in conjunction with slit-less rubber tubes or pegs and a similar result would follow. Furthermore, as shown in FIGS. 3–6, the standoff (26) can take the form of one or more clamp assemblies (28) that are capable of clampable attachment to the upper part (24) of a climbing tree stand. The clamp assembly (28) can have an attached piece of flexible material (30) such as flexible rubber that releasably retains the tree strap (14) as described herein, with the added benefit that such clamp assemblies (28) could be used to make the invention adaptable to tree stands already on the market. FIG. 6 shows a detail of such a mechanical clamp assembly (28) with an attached piece of rubber tubing having a slit, the clamp assembly (28) for forming a standoff (26) releasably attachable to horizontal surfaces of the upper part (24) of a tree stand, particularly V-bar-type stands. FIG. 3 shows an alternative embodiment of the clamp assembly (28) of FIG. 6; however, the clamp assembly (28) shown in FIG. 3 is for forming a standoff (26) that is releasably attachable to vertical surfaces of the upper part (24) of a tree stand, particularly strap-type stands. FIG. 5 shows another alternative embodiment of the clamp assembly (28) shown in FIGS. 3 and 6, with the clamp assembly (28) being releasably attachable around the upper part (24) of a tree stand, particularly cable-type and chain-type stands. FIG. 4 shows a piece of flexible rubber (30) having a slit (32) for receiving and readily releasing the tree strap (14) such as that used in the clamp assemblies (28) shown in FIGS. 3, 5 and 6. The rubber tubing (30) can have a tab (34) formed in an end away from the slit (32). The tab (34) can be cut along the length of the tube (30) as shown in FIG. 4 at "A" and then be capable of bendable attachment to the clamp (28) portion of the standoff (26) as shown in FIG. 4 at mode "B". The tubing (30) can be attachable by a mechanical fastener (36) such as a screw or a rivet, and such attachment could be made directly to the upper part (24) of a climbing tree stand, without the use of an intervening clamping mechanism (28). In an additional alternative embodiment, the thigh strap (10) and the waist strap (12) could be substituted with a 5-point type of harness system.

It is thus seen that a harness system has been invented that reduces the likelihood of chest and/or abdomen constriction when compared with traditionally-styled harnesses. Additionally, an invention has been developed that reduces the likelihood of impinging the user's back against a tree. Furthermore, a harness has been developed that is easily wearable and comfortable to a user. Most importantly, an invention has been developed that reduces the likelihood of inadvertent interference from the invention when climbing, yet is likely to remain readily available in the event of a fall. In combination, these factors, along with the other benefits and advantages discussed herein, will increase the likelihood of use of the device while climbing, sitting in and/or descending trees.

I claim:

1. A harness system for facilitating a user climbing a tree that does not inadvertently contact the tree during climbing but readily deploys so as to engage the tree in the event of a fall, the system comprising:

(a) a climbing tree stand part, the climbing tree stand part for assisting a user in climbing, sitting in and descending a tree, the climbing tree stand part having: a standoff integrated with the climbing tree stand part, the standoff for: (i) receiving a tree strap, (ii) retaining a tree strap from inadvertent contact with the tree while the user climbs, sits in, and descends the tree, (iii) quickly releasing a tree strap from the climbing tree stand part in the event of a fall, said standoff comprising one or more pieces of flexible rubber attached to the climbing tree stand; and (b) a harness part, the harness part having:
a thigh strap for bearing a user's weight about the user's thigh;
a waist strap for bearing a user's weight about the user's waist, the waist strap being attachable to the thigh strap; and
a tree strap for bearing a user's weight, the tree strap having a first end, a middle and a second end, the first end of the tree strap being attached to the waist strap, the second end of the tree strap being passable around the trunk of the tree and the second end of the tree strap being slideably attachable to the middle of the tree strap, the middle of the tree strap being releasably attached said one or more pieces of flexible rubber.

2. The harness system of claim 1, each piece of flexible rubber further comprising two ends:
a distal end and a near end; the near end of each piece of flexible rubber being attached to the climbing tree stand part, and the distal end of each piece of flexible rubber having a slit for receiving, retaining and quickly releasing a middle portion of a tree strap.

3. The harness system of claim 2 further comprising a clamp assembly releasably for attaching each piece of flexible rubber to the climbing tree stand part, the clamp assembly being attached to the near end of the flexible material.

4. The harness system of claim 1, the tree strap further comprising a slideable, mechanical fastener attached to the second end of the tree strap for attaching to the middle of the tree strap.

5. The harness system of claim 4 wherein the mechanical fastener is a carabiner.

* * * * *

UNITED STATES PATENT AND TRADEMARK OFFICE
CERTIFICATE OF CORRECTION

PATENT NO.  : 6,016,891
DATED       : January 25, 2000
INVENTOR(S) : Sava, John G.

It is certified that error appears in the above-identified patent and that said Letters Patent is hereby corrected as shown below:

On the title page:

Item , [76] Inventor's residence delete "Va.", should be --Pa.--

At column 8, line 43, insert --to --after "attached" and before "said".

Signed and Sealed this

Fifth Day of September, 2000

Attest:

Q. TODD DICKINSON

*Attesting Officer*

*Director of Patents and Trademarks*